(12) United States Patent
Hu

(10) Patent No.: US 7,688,602 B2
(45) Date of Patent: Mar. 30, 2010

(54) SYNCHRONOUS RECTIFIER CONTROL CIRCUIT AND METHOD

(75) Inventor: Jing Hu, Neubiberg (DE)

(73) Assignee: Infineon Technologies Austria AG, Villach (AT)

( * ) Notice: Subject to any disclaimer, the term of this patent is extended or adjusted under 35 U.S.C. 154(b) by 140 days.

(21) Appl. No.: 12/111,273

(22) Filed: Apr. 29, 2008

(65) Prior Publication Data

US 2009/0268494 A1 Oct. 29, 2009

(51) Int. Cl.
*H02M 3/335* (2006.01)
*H02M 5/42* (2006.01)
(52) U.S. Cl. ...................... 363/21.14; 363/89
(58) Field of Classification Search .............. 363/21.14, 363/53, 81, 89, 127
See application file for complete search history.

(56) References Cited

U.S. PATENT DOCUMENTS 5,946,207 A * 8/1999 Schoofs ...................... 363/127

6,456,106 B1 9/2002 Yee
7,161,813 B2 1/2007 Librizzi et al.

* cited by examiner

*Primary Examiner*—Shawn Riley
(74) *Attorney, Agent, or Firm*—Slater & Matsil, L.L.P.

(57) ABSTRACT

Circuit and method for controlling a synchronous rectifier. A circuit for monitoring the drain to source voltage of an SR transistor in a secondary side circuit of a voltage converter is disclosed, having a circuit for generating a gate control circuit for the SR MOSFET; the circuit preventing subsequent gate control signals until a primary turn on detection signal is received. In another embodiment a circuit for generating the primary turn on detection signal is provided. A method for controlling an SR transistor is disclosed comprising monitoring the drain to source voltage of the SR MOSFET, generating a gate control output, and preventing subsequent gate control output signals until a primary turn on detection signal is received. In another method embodiment a method for generating the primary turn on detection signal is disclosed. An SR embodiment incorporating the control circuit embodiments is disclosed.

25 Claims, 9 Drawing Sheets

SYNCHRONOUS RECTIFIER CONTROL CIRCUIT AND METHOD

TECHNICAL FIELD

The present invention relates generally to a circuit and method to improve the operation of a switched-mode power supply converter, and more particularly, to a circuit and method for efficient operation of a DC-DC converter circuit using a synchronous rectifier (SR).

BACKGROUND

Generally, a rectifier is needed in a switching mode power supply system to provide a DC output voltage from an input voltage. An SR can improve the power conversion efficiency by reducing the conduction losses in the rectifier device. Recently, metal oxide semiconductor field effect transistor (MOSFET) devices have been used as the SR due to low conduction losses of a properly selected MOSFET in these applications.

In MOSFET SR circuits, turn-on and turn off of the SR transistor must be synchronized with the control signal of the primary switch. Taking the flyback converter as an example in this text, the SR transistor is turned "off" by a gating signal (a potential at the gate of the MOS transistor against the source terminal) during the time that the primary switch is turned "on" or the secondary current reaches zero, and turned on when the primary switch is turned off. In addition, on the primary side of a switching converter, a primary gate, usually a large power MOSFET transistor is used to control current flowing through a primary coil. Typically, the primary switch or transistor is turned on and off by a pulse width modulated (PWM) signal with a fixed duty cycle or a pulse frequency modulated (PFM) signal.

A "dead time" should be established between switching cycles so that so-called "shoot through" will not happen. Shoot through means that the converter output is shorted through the SR transistor and the transformer secondary side winding and the output capacitor is unnecessarily discharged. Additionally, this shoot through may cause over current at the primary side and disturb proper operation of the converter. Besides these, the system efficiency and EMI performance may be negatively influenced, as well. To prevent this shoot through effect, timing circuitry is utilized to ensure that the gating signal to the SR MOSFET transistor is switched off before transformer secondary side voltage polarity switches.

Conventional approaches to the secondary side switching problem are to sense the switching of the primary gate (typically a transistor is used as the switching element) on the secondary side of the converter. Control circuitry then uses that signal to control the gate of the SR at the secondary side to create the dead time, so that the two transistors are not turned on at the same time. Conventionally, an impulse transformer is used to provide the primary gate switching signal to the secondary side of the circuit. Alternatively, the turn on for the primary can be determined by sensing the voltage across the drain to source of the SR transistor at the secondary side of the converter. By observing a rising edge of the drain-source voltage of the SR, the primary gate turn on can be detected.

A first disadvantage of these approaches is that they require added components, and reliability of operation of the secondary side power regulation circuits is not assured over a range of conditions which may occur in different voltage converter applications. In one known approach, a control circuit is provided on the secondary side of the converter that uses a rising edge detector across the SR to determine the primary gate turn on. However, this circuit is not able to distinguish an oscillation or noise event from a true primary switch turn on event. In a known enhancement to this approach, a slew rate monitoring detection circuit is used on the secondary side to detect a true primary gate turn on and distinguish oscillations or noise events. However, this slew rate monitoring circuit adds components and assumes a certain slew rate, which limits the applicability of this approach.

A second disadvantage of conventional approaches is that under certain circumstances, a secondary side control circuit that turns on the SR MOSFET based on the voltage sensed across the source-drain terminals of the SR MOSFET will erroneously turn the gating signal on a second time within a cycle period, due to oscillation or noise in the drain to source voltage signal being sensed. These voltage oscillations are typically present due to parasitic elements that are unavoidable in the circuitry. The erroneous second turn on of the SR MOSFET results in improper circuit operations.

A continuing need thus exists for efficient and reliable circuit and methods to control the operations of an SR in a switching converter circuit.

SUMMARY OF THE INVENTION

These and other problems are generally solved or circumvented and technical advantages are generally achieved by preferred embodiments of the present invention which provide an efficient and reliable detection of the primary gate turn on and thus enable efficient control of the SR MOSFET in a converter circuit. Further, preferred embodiments of the invention provide a system and method for ensuring that the SR MOSFET is not erroneously turned on in response to oscillations or noise in the voltage or current being monitored.

In accordance with an embodiment of the present invention, a method for detecting a primary switch turn on in the secondary control circuitry of a converter comprises monitoring the drain to source voltage of the SR MOSFET transistor; comparing the monitored voltage with a threshold; dynamically adjusting the threshold voltage cycle-by-cycle to follow the input voltage variation on the primary side; utilizing the comparator output to generate a primary turn on detection signal and using the comparator output, controlling the SR MOSFET.

In accordance with another embodiment of the present invention, a method for detecting the proper time to turn on the SR MOSFET in the secondary control circuit of a voltage converter comprises detecting a proper condition to turn on the SR MOSFET, turning on the SR MOSFET for a period, turning off the SR MOSFET, and preventing a subsequent turn on of the SR MOSFET until after a primary gate turn on detection signal subsequently occurs.

In accordance with another embodiment of the present invention, a circuit for controlling an SR MOSFET is provided, comprising a drain to source voltage monitoring circuit coupled to the drain and source terminals of the SR MOSFET; a first set reset flag coupled to the monitoring circuit and set when the monitoring circuit detects a transition in the drain to source voltage; a pulse generation circuit for generating a pulse in response to the first set reset flag; a second set reset flag for generating a control signal responsive to the output of the pulse generator and circuitry for inhibiting subsequent control signals until a primary turn on detection signal is received.

In accordance with another embodiment of the present invention, a circuit for generating the primary turn on detection signal is provided, comprising a differential amplifier for outputting a first voltage responsive to the drain to source voltage; an offsetting circuit for offsetting the first voltage and outputting an offset voltage that is offset by a voltage $\Delta v$; a sample and hold voltage circuit for sampling the offset voltage responsive to a sample input and outputting a reference voltage; and a comparator for generating the primary turn on detection circuit when the first voltage exceeds the reference voltage.

BRIEF DESCRIPTION OF THE DRAWINGS

For a more complete understanding of the present invention, and the advantages thereof, reference is now made to the following descriptions taken in conjunction with the accompanying drawing, in which.

The figures are presented to enhance comprehension of the embodiments and are representative, are not drawn to scale, and are not limiting with respect to the embodiments, the invention or the appended claims.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a switched-mode power converter. The invention may also be applied, however, to other circuits where an SR is used.

Figure 1:
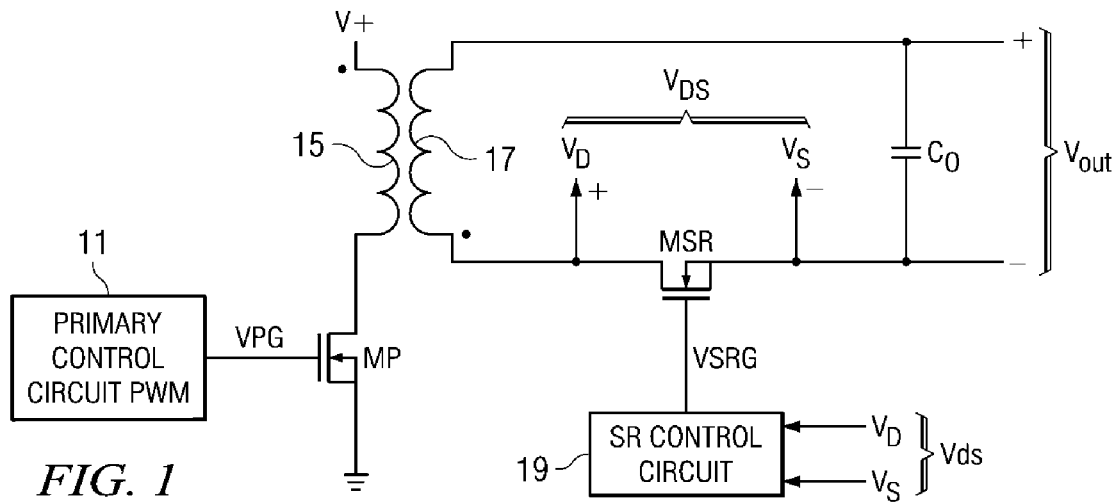
FIG. 1 illustrates a simplified circuit schematic for a power converter incorporating features of the invention.

With reference now to FIG. 1, there is shown an exemplary power converter circuit with flyback converter incorporating the features of embodiments of the present invention. In FIG. 1, a transformer of primary side coil 15 and secondary side coil 17 is depicted. A primary control circuit pulse width modulator is shown driving the gate voltage VPG for a primary switch MP; here an exemplary MOSFET transistor is shown. Other switching devices may be used. Input voltage V+ is coupled to primary side coil 15.

An SR MOSFET labeled MSR is depicted coupled to the secondary coil 17 and the output terminal Vout. A secondary side SR control circuit 19 is shown driving the gate terminal VSRG of the SR MSR. An output capacitor Co is shown coupled to complete the converter circuit.

In operation the circuit of FIG. 1 provides a DC output at the terminal Vout from an input voltage V+. A pulse width or pulse frequency modulated signal is provided to switch the primary side transistor MP by a voltage signal on the gate VPG, current flowing in the primary side coil 15 creates a magnetic field in the transformer and energy is stored in the transformer in form of magnetic energy. Once the primary switch is turned off, the magnetic energy is transferred back to electric energy and correspondingly current flows in secondary coil 17. SR MOSFET MSR is switched on and off by placing a gate voltage VSRG on the gate terminal from the SR control circuit 19. SR control circuit 19 monitors the voltage from the drain to the source VDS of the SR MOSFET. Based on the observed voltage VDS, SR control circuit 19 switches the gate voltage VSRG. When the primary transistor MP is active (turned on), the SR transistor is turned off and the transformer receives energy. After the primary switch is turned off, the SR is active (turned on), the secondary side current flows and the stored energy is discharged into the output capacitor Co.

The circuit of FIG. 1 operates in at least two modes, continuous conduction mode (CCM) and discontinuous conduction mode (DCM). In CCM, current flowing through the secondary coil 17 does not reach zero at the beginning of the following switching cycle when the primary side switch is turned on again. In DCM, current flow becomes zero before the beginning of the following switching cycle. In DCM mode, such as when the current consumed by the load is very slight (lightly loaded circuit), the voltage observed at VDS of the SR MOSFET may include oscillations, as is further described below.

Figure 2:
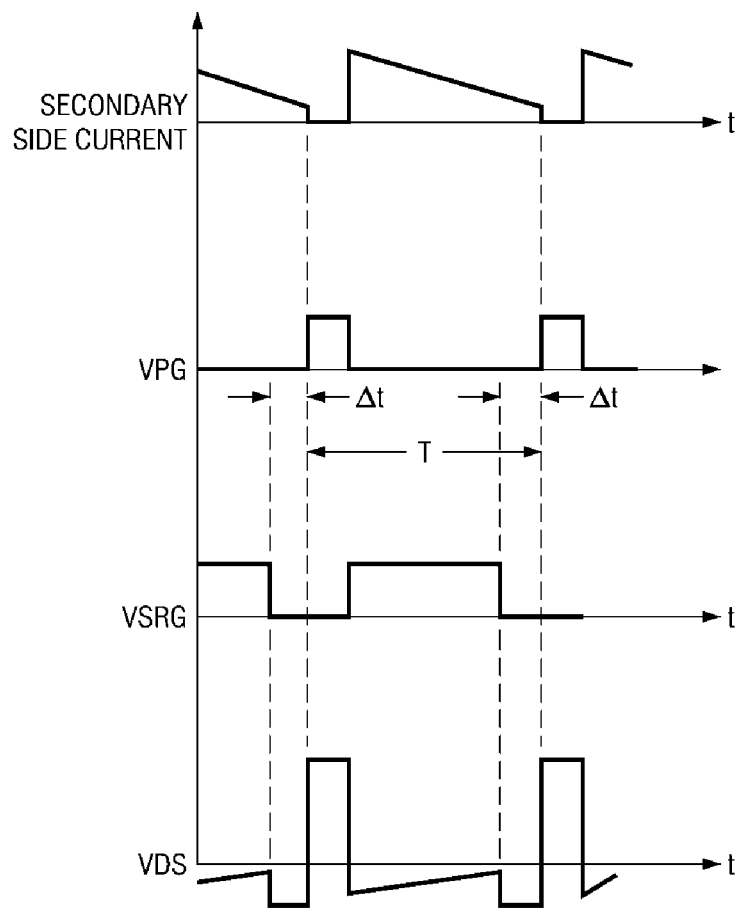
FIG. 2 illustrates voltage waveforms for key nodes of the circuit illustrated in FIG. 1 when the converter is operating in continuous conduction mode (CCM)

FIG. 2 depicts a timing diagram illustrating waveforms at several key points in the circuit of FIG. 1 during CCM operation. The top trace in FIG. 2 labeled "secondary side current" depicts the current flowing through the secondary coil and SR MOSFET over time. The trace labeled VPG depicts the voltage at the gate of the primary switching transistor. The trace labeled VSRG depicts the voltage at the gate of the SR transistor. The trace labeled VDS depicts the voltage across the drain to source of the SR MOSFET over time.

In FIG. 2, the timing diagram begins with the voltage VSRG at the gate of the SR MOSFET high. Initially the current flow on the secondary side is strong but ramps down towards zero as the stored charge is discharged into the output. With decreasing secondary current the voltage VDS drops, which is the product of the secondary side current and the channel resistance of the SR MOSFET. After a dead time $\Delta t$, which is used to prevent shoot through problems that may occur when both the primary transistor and SR are active simultaneously, the primary gate voltage VPG becomes active. The voltage VDS then rises quickly. At this time the SR MOSFET MSR is inactive (turned off) and the secondary side current is zero.

After the primary gate voltage VPG transitions to a low or inactive level, the SR MOSFET MSR is again active because the voltage on the gate terminal VSRG goes high, this is the output of the SR control circuit which may be activated, for example, when the voltage VDS of the SR MOSFET is observed falling below a threshold voltage. This change in voltage VDS indicates that the primary side transistor MP has switched off. In this manner the SR control circuit 19 may output the gating signal VSRG to the SR MOSFET and provide both the on time and the dead time Δt needed to rectify and provide the voltage at the output Vout.

The periodic operation of the circuit of FIG. 1 continues and the period of the timing cycle T is shown in FIG. 2. The dead time Δt is used to ensure that the circuit does not operate in a manner where both the primary side switch MP and the SR MOSFET MSR are both active at the same time.

Figure 3:
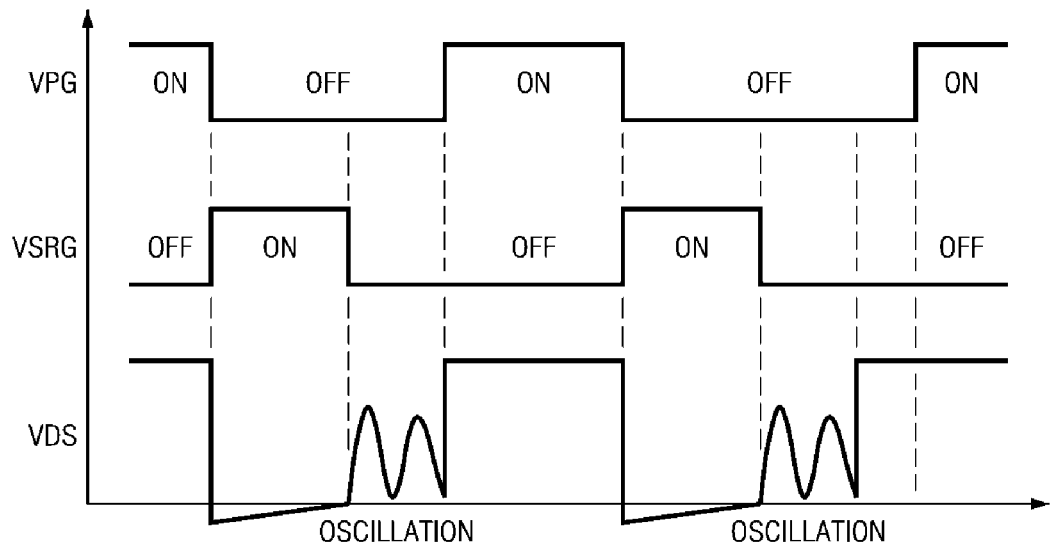
FIG. 3 illustrates voltage waveforms for the circuit illustrated in FIG. 1 when the converter is operating in discontinuous conduction mode (DCM)

FIG. 3 illustrates the operation of the circuitry of FIG. 1 in DCM. In FIG. 3, the primary gating signal VPG is periodically switched on and off. By the SR MOSFET control circuit the SR MOSFET MSR is switched on when the primary circuit is switched off. The SR MOSFET is turned off when the secondary side current is approaching zero and correspondingly the drain-source voltage is reaching zero.

In FIG. 3 the voltage across the SR MOSFET MSR is depicted in the bottom trace. In FIG. 3, as the secondary switch is switched off, an oscillation is observed in the drain to source voltage waveform VDS due to parasitic elements in the circuit. The SR control circuit 19 in FIG. 1 relies on the voltage VDS waveform to generate the control signal VSRG to control the SR MOSFET. Under certain circumstances, the oscillation may trigger a second turn-on for the secondary switch SR MOSFET MSR. This would be erroneous and would result in incorrect circuit operation. Oscillations as shown in FIG. 3 are known to occur when converter circuits are operated in discontinuous conduction mode. DCM operation can occur under very light loading conditions and means that the current flow through the transformer goes to zero before the beginning of the next switching cycle. In CCM the current flow is continued, and in that mode, the oscillations of FIG. 3 are not present.

Figure 4:
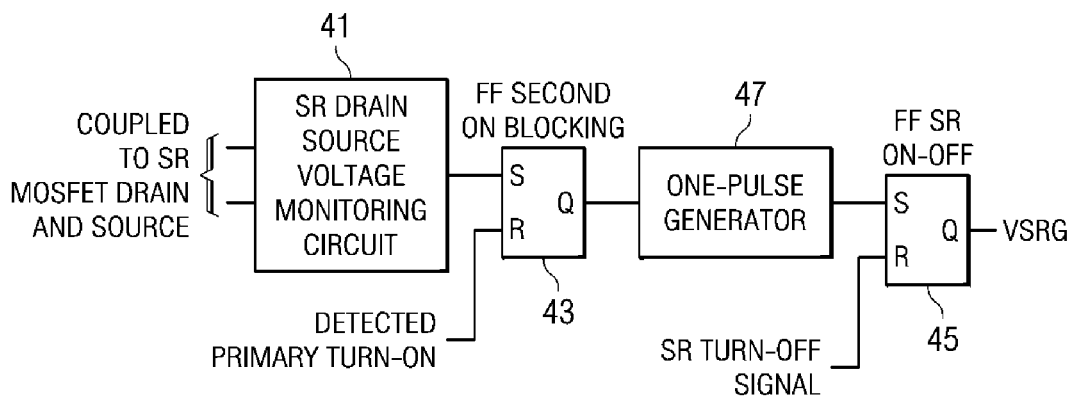
FIG. 4 illustrates an embodiment of the invention for generating a control signal to an SR.

FIG. 4 illustrates in a simplified block diagram an embodiment of the invention for correctly generating the control voltage VSRG in the presence of oscillations such as illustrated in FIG. 3. The embodiment operates to sense the voltage VDS of the SR and generate the gate control voltage for the SR correctly, in spite of the oscillations that may occur in the voltage VDS across the SR MOSFET.

In FIG. 4, an SR MOSFET drain source monitoring circuit 41 is coupled to a flip-flop register labeled 43 that acts as a second on blocking device, allowing the circuit to generate one VSRG pulse in a periodic cycle T. A one-pulse generator 47 (sometimes called a "one-shot") generates a high voltage pulse in response to the output of flip-flop 43. This one-pulse generator is then coupled to a second set-reset flip-flop 45. The output of the set reset flip-flop 45 is then coupled to output VSRG, and that output is coupled to the gate of the SR MOSFET MSR in FIG. 1.

In operation, the drain to source voltage monitoring circuit 41 compares the voltage to an expected voltage. When the drain-source voltage VDS falls as the primary switch is turned off, for example, the monitoring circuit may indicate that voltage has fallen through a threshold voltage by outputting a high voltage to the flip-flop 43 SET input, which will cause the flip-flop state to become a "1" and output a high voltage on the Q terminal. The one-pulse generator will see a high voltage on its input and generate a pulse to the set input S of flip-flop 45, which will cause the output voltage VSRG to go high.

When the energy in the secondary transformer coil is transferred out to the load, the voltage VDS will rise, and as the current falls, the input SR turn off signal will reset the flip-flop 45, so that the output signal VSRG falls low again. At this point, the blocking flip-flop 43 is still set, and will remain set. If an oscillation subsequently occurs in the voltage VDS as shown in FIG. 3, following the SR turn off signal, the blocking flip-flop will not change state, even if a second set signal is received from the SR drain-source voltage monitoring circuit. Accordingly, the signal VSRG will remain low.

When the primary switch is again turned on, indicating a new cycle has started, a signal labeled "Detected primary turn on" is active and resets flip-flop 43, the blocking flip-flop, to a "0" state. Now in this cycle, the blocking flip-flop will again begin at state 0 and when the voltage VDS for the SR MOSFET MSR again falls, following the primary switch turn off, the circuit 47 and SR flip-flop 45 can again generate the pulse VSRG to the gate of the SR MOSFET MSR. The use of the flip-flop 43 thus ensures that the control signal VSRG is only generated once in the cycle, and is not erroneously turned on a second time in response to noise or oscillations on the VDS voltage.

"SR turn-off" signal in FIG. 4 comes from another circuit, which is not the focus of this application. With this signal the SR MOSFET is turned off at the right time. More precisely, the SR turn-off signal is active at the moment Δt before the beginning of the next switching cycle in CCM or at a quasi zero condition of the secondary side current in DCM. For the end of the turn-off signal generation, the voltage VDS of the SR MOSFET is monitored.

The circuit of FIG. 4 requires an input signal "Detected primary turn on." This signal is preferably generated by an embodiment that is coupled only to components in the secondary circuit, thus eliminating the need for another transformer coil or other signal coupled to the primary circuit.

Figure 5:
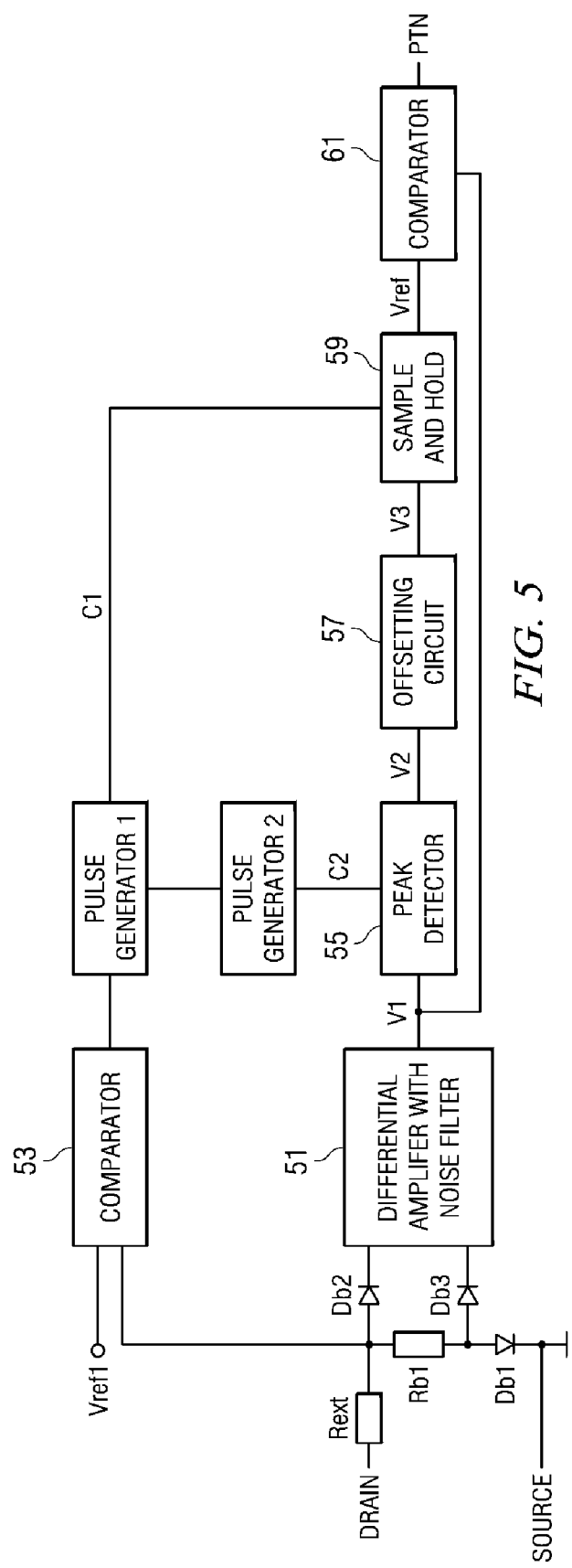
FIG. 5 illustrates in a block diagram, an embodiment of the invention for generating a primary switch turn on detection signal.

FIG. 5 illustrates, in a simplified block diagram, an embodiment for providing the primary turn on detection signal PTN to the control circuit of FIG. 4. In FIG. 5, the drain and source terminals of the SR MOSFET MSR (of FIG. 1) are coupled to input terminals labeled Drain and Source. Diodes Db2 and Db3 provide signal isolation from other circuit components; a comparator 53 compares the drain to source voltage to a reference voltage Vref1 and the output of the comparator is used by a pulse generator 1 to generate a signal C1, and a second pulse generator 2 generates a second pulse C2. The input voltage VDS is also input to a differential amplifier 51 with a noise filter that outputs voltage V1. The voltage V1 is input to a peak detector circuit 55 and the peak detector circuit outputs a voltage V2. An offsetting circuit 57 provides a voltage offset and the output is voltage V3. A sample and hold circuit 59 samples voltage V3 according to the signal C1 developed by the comparator. Finally, a second voltage comparator compares the voltage Vref from the sample and hold circuit 59 to the voltage V1, and when a certain condition is met, outputs the signal PTN to the control circuit of FIG. 4.

Figure 6:
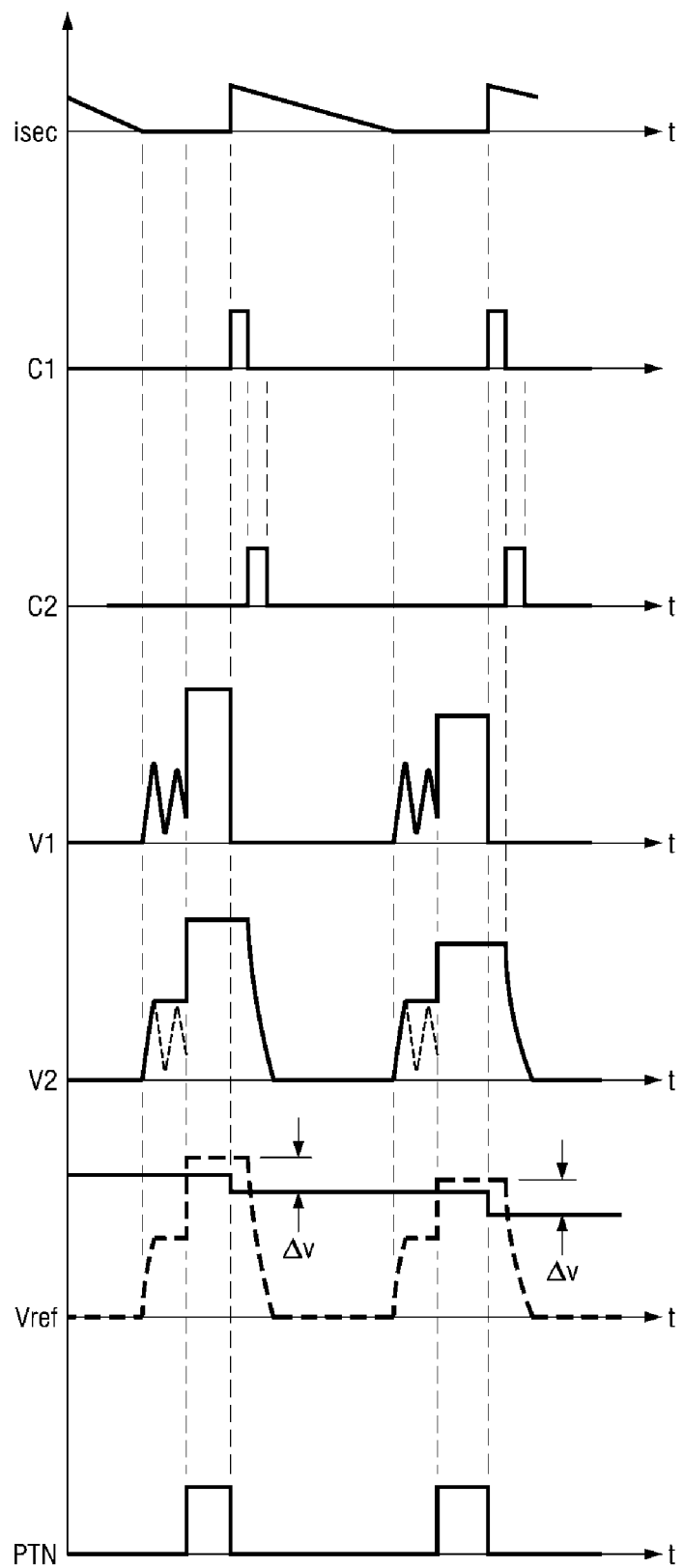
FIG. 6 illustrates voltage waveforms of the embodiment illustrated in FIG. 5 when the converter is operating in DCM.

FIG. 6 depicts, in a voltage timing diagram, exemplary voltage waveforms at various points in the block diagram of FIG. 5. In FIG. 6, the embodiment of FIG. 1 is being operated in a DCM. The top trace labeled "isec" illustrates the current flowing through the secondary circuit. The clock pulse C1 developed by the pulse generator 1 from the output of the first comparator 53 is shown in the second trace. The clock pulse C2 to clear the peak detector circuit 55 is illustrated in the third trace. The voltage V1 depicts the amplified and filtered drain to source voltage VDS from the input terminals, after amplification by amplifier 51. The oscillation in the voltage V1, corresponding to oscillations received on voltage VDS, is seen, indicating the converter circuit is operating in DCM mode.

In FIG. 6, the V1 voltage corresponds to the amplified version of the input voltage VDS observed across the SR MOSFET MSR. The voltage V2 is an output from the peak detector circuit 55 and thus, the oscillations present in V1 are not present in the V2 waveform as can be seen in the timing diagram. V3 is output from an offsetting circuit 57 that receives voltage V2 as an input. The offsetting circuit 57 ensures a difference Δv will always be present between the voltage V1 and the reference voltage, so that enough differential voltage is always present for the comparator 61 to operate correctly. Vref is generated by the sample and hold circuit 59 when clocked by pulse C1. The comparator outputs signal PTN when the voltage V1 exceeds Vref by a threshold as shown in the figure. The oscillations in V1 are not indicated by the PTN signal, as they are removed by the operation of the peak detector and sample and hold circuitry.

In operation, the embodiment of FIG. 5 begins a cycle of operation when comparator 53 indicates that current isec has started to flow in the secondary. This is determined by comparing voltage at the input VDS of the SR MOSFET to a reference potential Vref1. As can be seen from FIG. 2, the voltage VDS is at a high when the primary transistor is on (voltage VPG in FIG. 2 is high) and VDS falls below a threshold when the primary transistor or switch is turned off (voltage VPG falls to zero) which corresponds to a peak in the secondary side current. Thus, a reference voltage may be set for Vref1 which the comparator can compare to the incoming voltage VDS. Comparator 53 outputs a signal to pulse generator 1, and a pulse C1 is then generated to clock the sample and hold circuit 59. Sample and hold circuit 59 then holds voltage V3 as a reference for comparator 61. Voltage V3 is a potential output by offsetting circuit 57 which is a lowered voltage derived by reducing or offsetting the peak detector 55 voltage V2 by an offset Δv, so that Vref is always lower than the incoming voltage V1 by an amount that ensures the comparator 61 can detect the voltage on V1 correctly. After sample and hold circuit 59 is clocked by signal C1, signal C2 is sent to clear the output of peak detector 55. The reference voltage Vref is then derived from the peak voltage of the previous cycle of V1. As the observed input voltage, the drain to source voltage VDS of the SR MOSFET rises, V1 rises, and when it exceeds Vref, the circuit will output a signal PTN from comparator 61. The generation of the reference voltage Vref using the peak detector and sample and hold circuitry of FIG. 5 ensures that the reference voltage is adjusted dynamically at each cycle and thus, should the input voltage V+ on the primary side change, the PTN detection circuit continues to operate correctly because the circuit accordingly provides dynamic changes to the reference Vref. In this manner, the circuit of FIG. 5 can accurately output the signal PTN indicating that the primary transformer has turned on. This signal is then used by the control circuit of FIG. 4 to reset the SR flip-flop that provides the "second on blocking" so that the signal VSRG to the gate of the SR MOSFET is correctly output. Further, the PTN detection circuit can be used by the SR control gate circuit of FIG. 1 to output the control gate signal VSRG and no additional signal or impulse transformer is required from the primary, all the sensing is done on the secondary side. Note in the waveforms in FIG. 6 that the output signal PTN is high when the voltage V1 exceeds the reference voltage Vref that was set by the voltage V1 on the previous cycle, thus the reference voltage is adjusted each cycle after the PTN signal is output. In this manner, the comparator 61 compares the present voltage V1 to a reference Vref determined from a prior cycle.

Figure 7:
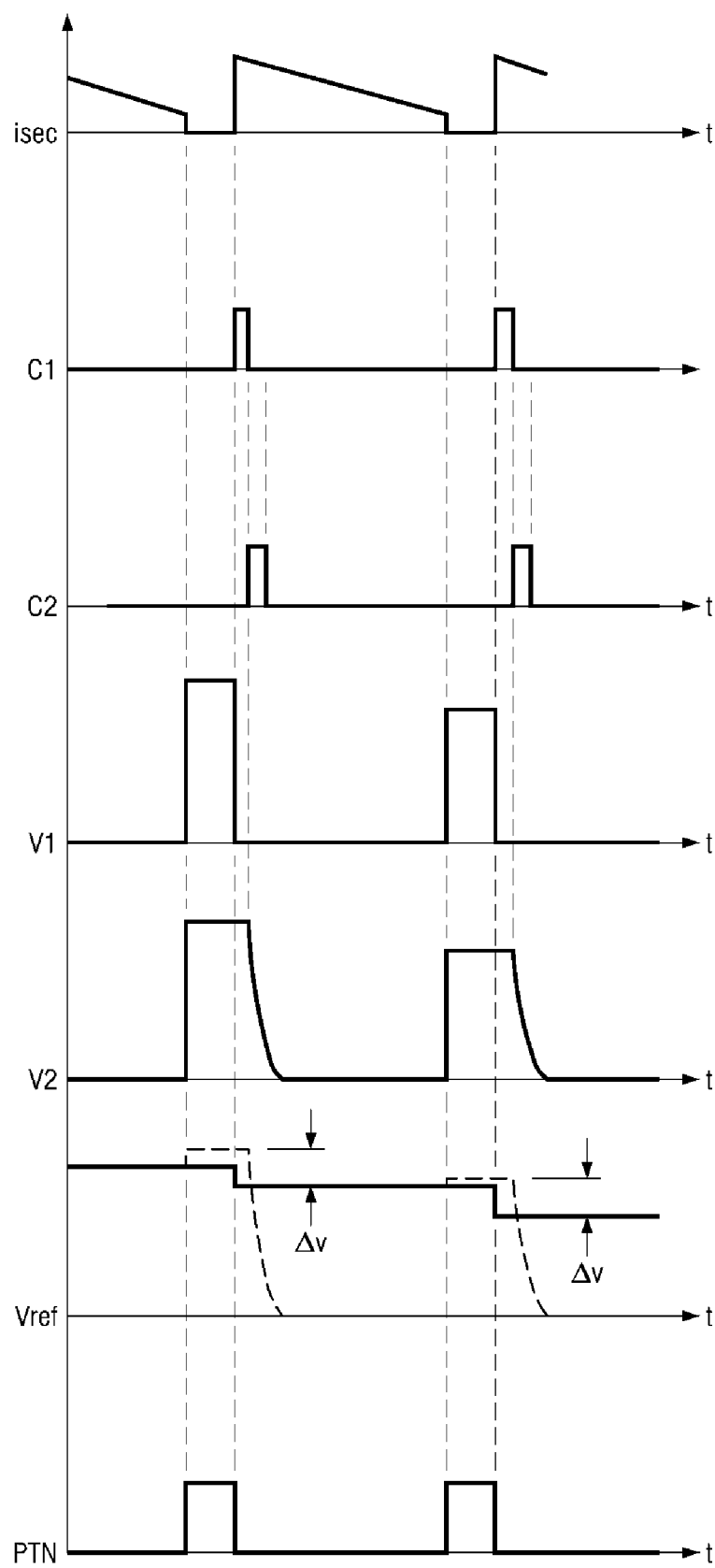
FIG. 7 illustrates additional voltage waveforms of the embodiment illustrated in FIG. 5 when the converter is operating in CCM.

FIG. 7 depicts the voltage waveforms of the circuit of FIG. 5 when the converter is operated in CCM. No oscillation at the drain to source voltage input across the SR MOSFET is present in this mode of operation as seen in voltage waveform V1 in the diagram. The other waveforms in the timing diagram of FIG. 7 are very similar to the waveforms in FIG. 6 and will not be further described here.

Figure 8:
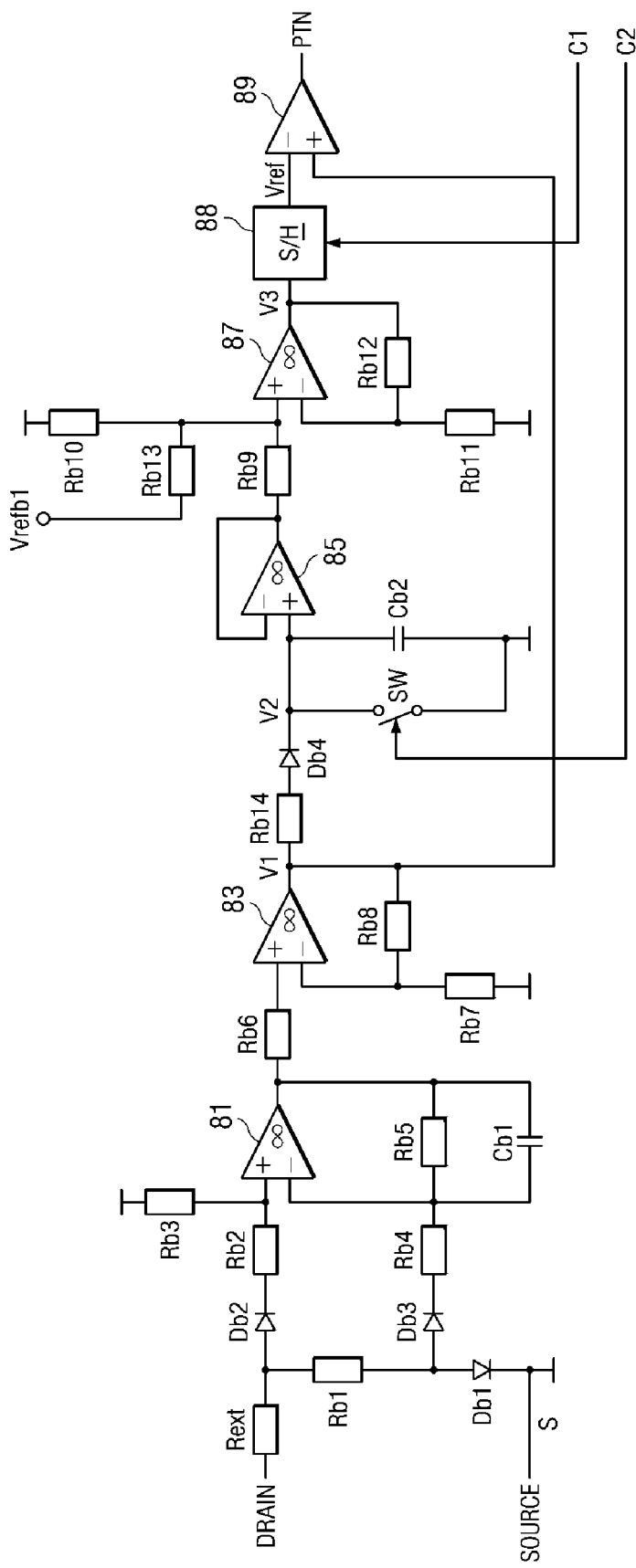
FIG. 8 illustrates a possible circuit implementation for the embodiment illustrated in FIG. 5.

An embodiment for implementing the functional blocks of FIG. 5 in a practical circuit is illustrated in FIG. 8. In FIG. 8, operational amplifier 81 and passive components resistors Rb4, Rb2, Rb1, Rb3, Rb5, capacitors Cb1, diodes Db1, Db2, Db3 and operational amplifier 83 and resistances Rb6, Rb7 and Rb8 provide an embodiment for the differential amplifier 51 in FIG. 5, while the stage consisting of operational amplifier 83 and resistances Rb6, Rb7 and Rb8 is optional. The differential amplifier outputs voltage V1. Resistors Rb14, Db4, capacitor Cb2 and switch SW provide an exemplary circuit for implementing the peak detector function 55 in FIG. 5 and output voltage V2. Operational amplifier 85 is connected as a voltage follower which decouples the voltage V2 and the following voltage offsetting circuit. Operational amplifier 87, resistors Rb9, Rb13, Rb10, Rb11 and Rb12 provide the offset function 57 of FIG. 5 and outputs voltage V3. Sample and hold circuit 88 generates a sampled version of voltage V3 in response to the clock signal C1. Comparator 89 compares the voltage at V1 to the Vref output of the sample hold circuit 88 and when the voltage V1 exceeds Vref, the PTN signal, for "Primary Turn On Detected", is output by the circuit.

Figure 9:
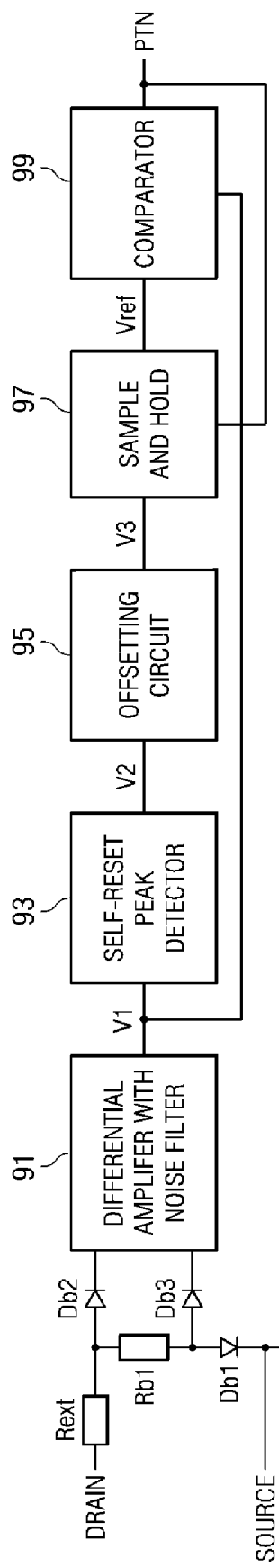
FIG. 9 illustrates an alternate block diagram for another embodiment of the invention.

FIG. 9 illustrates in a simplified block diagram an alternative embodiment for the primary turn on detection function. In FIG. 9, the "drain" and "source" inputs are again coupled to the drain and source terminals of the SR MOSFET (see FIG. 1) to detect the change in the drain to source voltage. Differential amplifier 91 receives this voltage as an input, and outputs an amplified and filtered voltage V1 that corresponds to the input voltage. A peak detector 93 then receives voltage V1 and outputs voltage V2. An offsetting circuit 95 then adds a voltage offset and outputs voltage V3. The sample and hold function 97 then samples, and holds the offset function output V3 to form voltage Vref. Comparator 99 then compares the generated reference voltage Vref to the voltage V1 and when voltage V1 exceeds the reference voltage, outputs signal PTN. Although this embodiment is arranged slightly differently than the block diagram in FIG. 5, the output PTN will operate in the same manner and the voltage waveforms of FIGS. 6 and 7 still apply to this embodiment block diagram.

Figure 10:
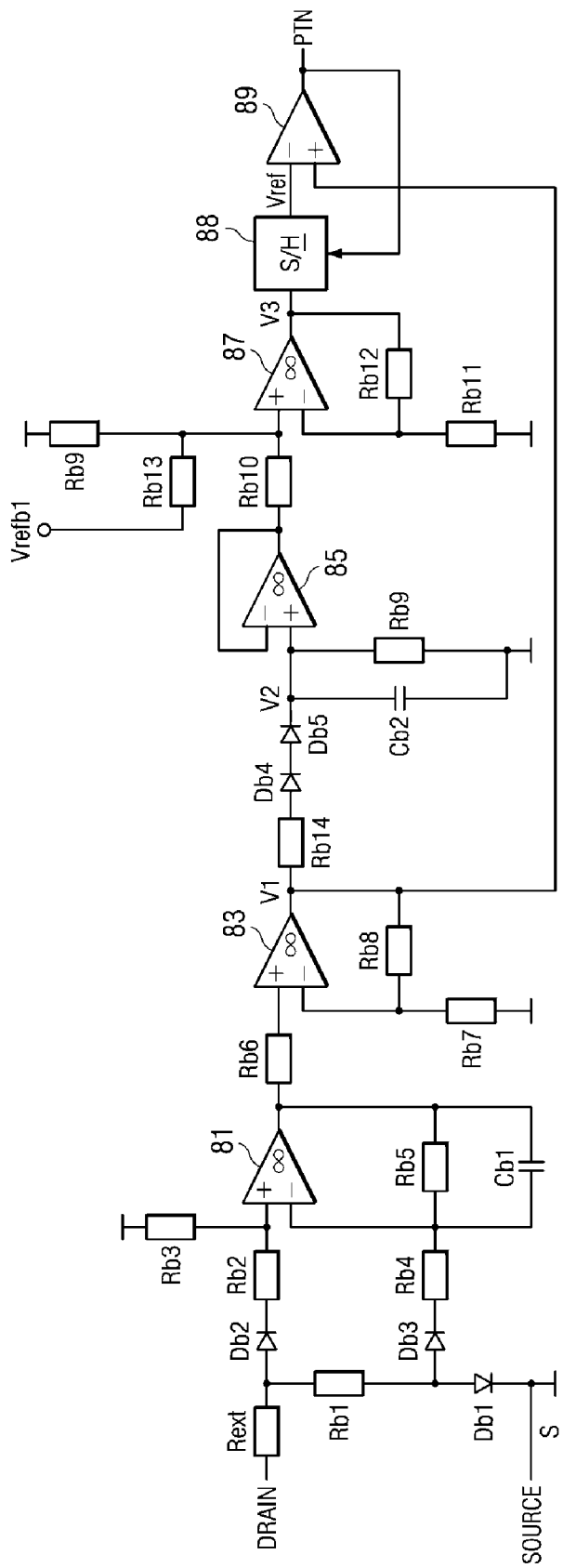
FIG. 10 illustrates a possible circuit implementation of the embodiment of FIG. 9.

FIG. 10 illustrates as an embodiment an exemplary circuit implementation of the block diagram of FIG. 9. In FIG. 10, the circuit elements are basically the same as for the embodiment of FIG. 8, however the connections are somewhat different to simplify the circuit. Operational amplifier 81 and components resistors Rb1, Rb2, Rb3, Rb4 and Rb5, diodes Db1, Db2 and Db3, and capacitor Cb1, and operational amplifier 83 and resistors Rb6, Rb7 and Rb8 provide the differential amplifier and noise filter function 91 of FIG. 9 and output voltage V1. Resistor Rb14, diodes Db4 and Db5, and capacitors Cb2 and Rb9 output the peak detector voltage V2 at the input of operational amplifier 85. Resistors Rb13, Rb10, Rb9, Rb11 and Rb12, and operational amplifier 87 output the offset voltage V3 at the output of the operational amplifier. Sample hold circuit 88 outputs the sample and hold voltage Vref, but is now clocked by signal output signal PTN.

The operation of the circuit embodiment of FIG. 10 is similar to the circuit of FIG. 8, however by using self clocking sample hold circuit 88 and a self resetting peak detector circuit, the need for clock signals C1 and C2 is eliminated and thus the circuit is simpler to implement. The waveforms V1, V2, Vref and PTN from FIGS. 6 and 7 still apply to this embodiment as the overall function of the circuit embodiment, and the block diagram embodiment, illustrated in FIGS. 9 and 10, is the same as for the embodiments of FIGS. 5 and 8.

Figure 11:
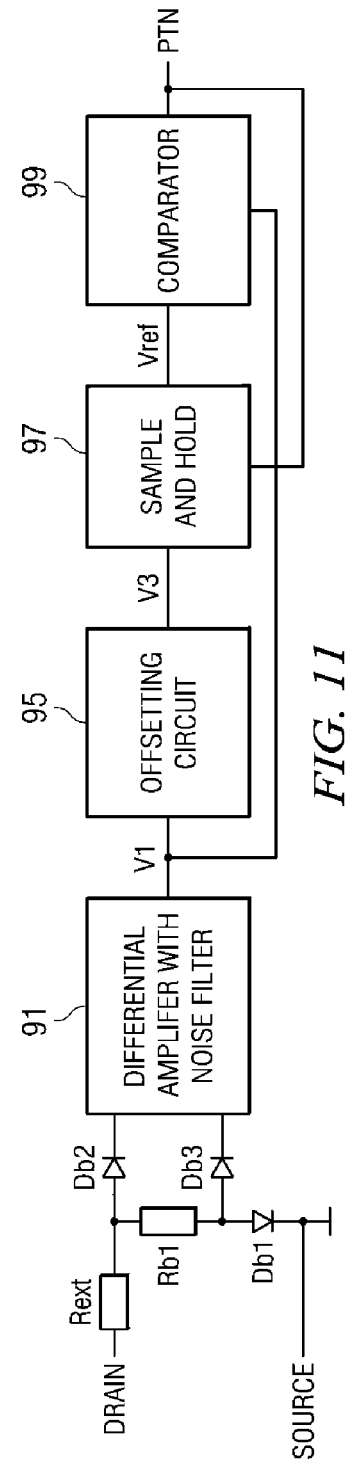
FIG. 11 illustrates a block diagram for another alternate embodiment of the invention.

Similarly, FIG. 11 illustrates in a simplified block diagram another alternative embodiment for providing the primary turn on detection function. In FIG. 11, the functional blocks 91, 95, 97 and 99 are again coupled to output the signal PTN indicating a primary turn on detection has occurred. However the functions have been further simplified in this exemplary embodiment by eliminating the peak detector function. Differential amplifier 91 again is coupled to the "Drain" and "Source" inputs which are coupled to observe the drain to source voltage of the SR MOSFET in FIG. 1.

Figure 12:
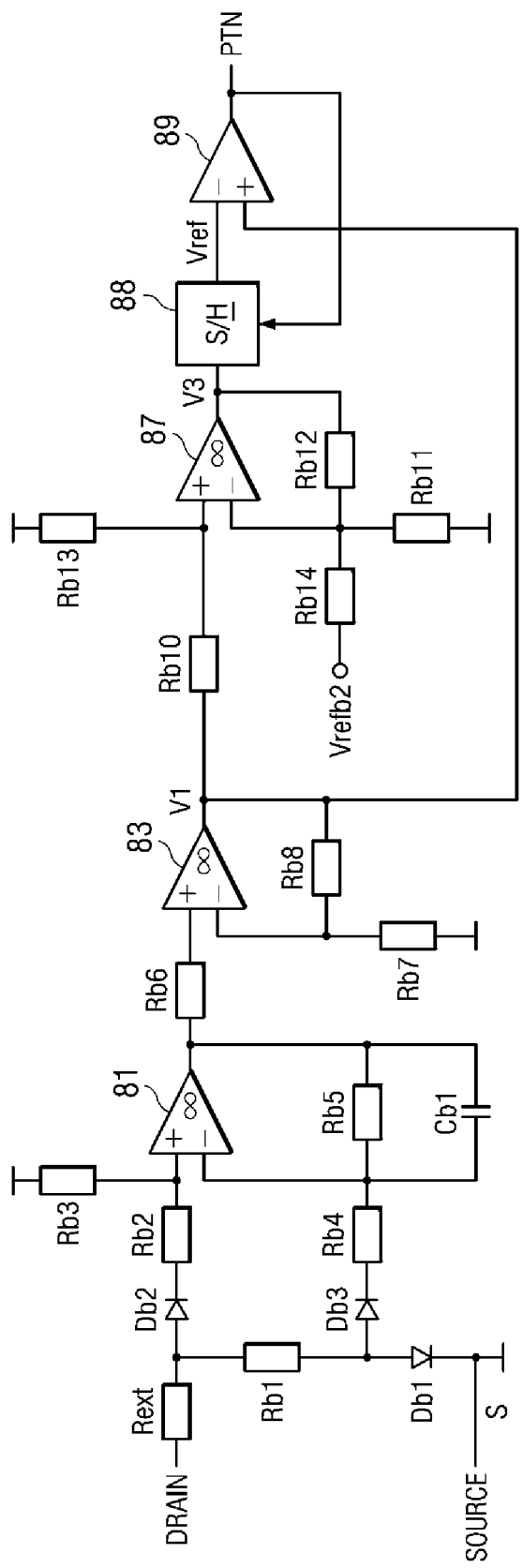
FIG. 12 illustrates a possible circuit implementation of the embodiment of FIG. 11.

FIG. 12 illustrates an exemplary circuit embodiment to implement the functional blocks of FIG. 11. In FIG. 12, differential amplifier 81 again is coupled to receive the voltage from drain to source of the SR MOSFET MSR. Passive components diodes Db1, Db2 and Db3, resistors Rb1, Rb2, Reb3, Rb4, and Rb5, and capacitor Cb1 form a differential amplifier and with operational amplifier 81 and resistors Rb6, Rb7 and Rb8, form a circuit that outputs voltage V1. Operational amplifier 87 and passive components Rb10, Rb11, Rb12, Rb13 and Rb14 form the offsetting circuit that outputs voltage V3. Sample/hold block 88 again samples, and holds, the voltage V3 in response to the output PTN. Comparator 89 receives the Vref voltage output from the sample hold block 88 and compares voltage V1 to that voltage reference, and outputs a signal PTN when the voltage V1 exceeds the reference, indicating that the primary turn on has occurred. Thus the primary turn on detection signal PTN needed to control the SR MOSFET MSR at its gate is again determined.

The primary turn on detection embodiments presented above in FIGS. 5, and 8-12, each provide advantages in that the reference voltage used to compare the observed drain to source voltage is developed dynamically. By using the sample and hold function to determine Vref for each cycle, dynamic changes in the voltage V1 to the input voltage are accounted for. In contrast, if a fixed reference for Vref was used, the primary detection function can only operate in applications where that fixed voltage reference applies. By dynamically developing the voltage reference Vref on a cycle by cycle basis, the embodiments presented here advantageously provide a primary turn on detection function that can apply to many applications for the converter circuit without the need to change the voltage reference used.

The embodiments for blocking the second turn on of the SR MOSFET advantageously provide a function that efficiently prevents a mis-triggering of the SR gate with a minimal number of components, improving the performance of the function over the prior art approaches with a minimal added cost.

The embodiments for the primary turn on detection and the second turn on blocking features described above may be used together in an embodiment for a secondary side control circuit. However, that is not required, the primary turn on detection embodiments may be used singly, or the second on blocking embodiment may be used singly, and the use of these embodiments will provide advantages over the known conventional approaches.

A method embodiment for providing a secondary side SR gate signal which prevents erroneous turn on during a cycle is to observe the drain to source voltage on the SR MOSFET, to set a first flag indicating a transition in the drain to source voltage below a threshold, to provide a pulse in response to the set flag, to set a second flag in response to the pulse, to reset the second flag in response to an SR turn off signal, and to couple the SR gate output to the gate of the SR MOSFET. The first flag remains set until a primary turn on detected signal is received which resets the first flag. In this manner, once a set signal is output to the SR gate, no additional signals are output to the SR gate until a subsequent "primary turn on detected" signal is received.

A method embodiment for providing a primary turn on detection signal in a secondary circuit is provided which does not require any coupling to the primary side. In this method, the drain to source voltage is observed on the SR MOSFET. Current flowing in the body diode of the SR MOSFET is determined when the observed voltage VDS exceeds a threshold. A clock signal is generated to a sample hold circuit that holds a peak detected voltage from a prior cycle as a reference voltage. The observed voltage is amplified and filtered, and a first voltage is output corresponding to the observed voltage. The first voltage is compared to the reference voltage, and a primary turn on detected signal is output when the first voltage exceeds the reference voltage. The reference voltage is updated each cycle. This method advantageously does not require coupling and singly from the primary side, and the use of a dynamically generated reference voltage that is adjusted during each cycle provides a method for determining the primary turn on has occurred over a wide range of operating conditions.

Although the present invention and its advantages have been described in detail, it should be understood that various changes, substitutions and alterations can be made herein without departing from the spirit and scope of the invention as defined by the appended claims. For example, although differential operational amplifier circuits are shown in some embodiments, known circuit design alternatives could be used to implement the functions.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controlling a synchronous rectifier (SR), comprising:

providing an SR transistor having a source terminal, a drain terminal and a gate terminal; coupling the drain to source current conduction path of the SR transistor between a secondary coil of a transformer and a first voltage output terminal;

coupling a second voltage output terminal to the secondary coil;

coupling an output capacitor across first and second voltage output terminals;

monitoring the drain to source voltage across the SR transistor;

determining a change in the drain to source voltage to a voltage below a threshold indicating a primary switch coupled to a primary coil of the transformer has turned off;

setting a first flag indicating the change;

generating a pulse in a one pulse generator responsive to the first flag;
setting an output signal coupled to the gate of the SR transistor responsive to the pulse;
resetting the output signal; and
inhibiting further pulses from the one pulse generator by leaving the first flag set until a primary turn on detected signal is received.

2. The method of claim 1, wherein coupling the output signal to the gate terminal of the SR transistor controls a SR secondary side circuit.

3. The method of claim 1, and further comprising:
resetting the first flag in response to receiving the primary turn on detected signal.

4. The method of claim 3, wherein receiving the primary turn on detected signal further comprises:
detecting a peak voltage across the drain to source terminals of the SR transistor during a time period in a peak detector;
detecting a voltage across the drain to source terminals of the SR transistor below a second threshold;
triggering a sample hold circuit coupled to the output of the peak detector, and outputting the sampled voltage as a reference voltage;
clearing the peak detector;
receiving the voltage across the drain to source terminals of the SR transistor greater than the reference voltage; and
outputting a primary turn on detection signal.

5. A method for detecting a primary switch turn on in a voltage converter secondary circuit, comprising:
coupling the drain to source path of an SR transistor between a secondary coil of a transformer and a first voltage output terminal;
coupling a second voltage output terminal to the secondary coil;
coupling an output capacitor across the first and second output terminals;
generating a first pulse signal to a sample and hold circuit coupled to the drain to source voltage of the SR transistor and outputting a reference voltage;
comparing the reference voltage to the drain to source voltage of the SR transistor; and
outputting a primary turn on detected signal when the drain to source voltage of the SR transistor exceeds the reference voltage.

6. The method of claim 5, and further comprising:
a differential amplifier coupled to an input receiving the voltage at the drain terminal of the SR transistor and to an input receiving the voltage at the source terminal of the SR transistor, having an output coupled to the sample and hold circuit input.

7. The method of claim 6, wherein the differential amplifier further comprises a filter.

8. The method of claim 6, and further comprising an offsetting circuit coupled between the output of the differential amplifier and the input of the sample and hold circuit, for generating a voltage offset to reduce the voltage input to the sample and hold circuit by a voltage $\Delta v$.

9. The method of claim 8, and further comprising:
a peak detector circuit coupled to the differential amplifier circuit and determining a peak voltage output by the differential amplifier circuit over a time period.

10. The method of claim 9, wherein the peak detector is a self-resetting peak detector.

11. The method of claim 6, wherein the first pulse signal generated to the sample and hold circuit is the primary turn on detected signal.

12. The method of claim 9, and further comprising:
comparing the drain to source voltage of the SR transistor to a first reference voltage; and
detecting when the drain to source voltage of the SR transistor falls below a threshold.

13. The method of claim 12, and further comprising:
responsive to the detecting, generating the first pulse signal to the sample and hold circuit to sample the voltage input.

14. The method of claim 13, and further comprising:
responsive to the detecting, generating a second clock pulse to reset the peak detector.

15. A circuit for controlling a synchronous (SR) transistor, comprising:
a voltage monitoring circuit coupled to monitor a drain to source voltage of the SR transistor and to output a signal indicating a transition;
a first set reset circuit having a set input coupled to the voltage monitoring circuit;
a one-pulse generator coupled to an output of the first set reset circuit;
a second set reset circuit having a set input coupled to the one pulse generator and having an output; and
an output for controlling the gate of the SR transistor coupled to the output of the second set reset circuit.

16. The circuit of claim 15, and further comprising:
an input for receiving an SR turn off signal coupled to the reset input of the second set reset circuit.

17. The circuit of claim 16, and further comprising:
an input for receiving a primary turn on detected signal coupled to the reset input of the first set reset circuit.

18. The circuit of claim 17, and further comprising:
circuitry configured to output the primary turn on detected signal, comprising:
an amplifier coupled to receive the drain to source voltage of the SR transistor and to output a first voltage;
an offset circuit coupled to receive the first voltage and to output an offset voltage that is less than the peak of the first voltage by a voltage $\Delta v$;
a sample and hold circuit coupled to receive the offset voltage and to output a voltage reference responsive to a sample pulse input; and
a voltage comparator circuit configured to output the primary turn on detected signal when the first voltage exceeds the voltage reference.

19. The circuit of claim 18, and further comprising:
a peak detector circuit coupled between the differential amplifier and the offsetting circuit and operable to output a peak voltage corresponding to the highest level of the drain to source voltage of the SR transistor over a time period.

20. A circuit for controlling an SR MOSFET, comprising:
means for determining when the drain to source voltage of the SR MOSFET transitions below a predetermined threshold and outputting a threshold detected signal;
means for setting a first set reset flag responsive to the threshold detected signal;
means for generating a pulse responsive to the first set reset flag;
means for setting a second set reset flag and outputting a gate control signal responsive to the pulse;
means for resetting the second set reset flag; and
means for inhibiting the means for generating a pulse until a primary turn on detected signal is received.

21. The circuit of claim 20, and further comprising:
means for resetting the first set reset flag responsive to receiving the primary turn on detected signal.

22. The circuit of claim 21, and further comprising:
means for generating the primary turn on detected signal, comprising:
  means for receiving the drain to source voltage of the SR MOSFET and for outputting a first voltage;
  means for generating a peak voltage corresponding to the highest voltage level of the first voltage over a time period;
  means for offsetting the peak voltage by reducing the peak voltage by a $\Delta v$ and outputting a second voltage;
  means for holding a sample of the second voltage and outputting the sampled voltage as a reference voltage; and
  means for comparing the first voltage to the reference voltage and outing the primary turn on detected signal when the first voltage exceeds the reference voltage.

23. A synchronous rectifier (SR), comprising:
an SR transistor having its drain to source path coupled between a secondary coil of a transformer and a first voltage output terminal, and having a gate control terminal;
a second voltage output terminal coupled to the secondary coil of the transformer;
an output capacitor coupled between the first and second voltage output terminals; and
an SR control circuit having an output coupled to the gate control terminal, comprising:
  a voltage monitoring circuit coupled to monitor the drain to source voltage of the SR transistor and to output a signal indicating a transition;
  a first set reset circuit having a set input coupled to the voltage monitoring circuit;
  a one-pulse generator coupled to the output of the first set reset circuit;
  a second set reset circuit having a set input coupled to the one pulse generator and having an output; and
  an output for controlling the gate of the SR transistor coupled to the output of the second set reset circuit.

24. The SR of claim 23 and further comprising:
a primary coil of the transformer coupled to a first voltage supply;
a primary switch coupled between the primary coil and a ground reference and having a control terminal; and
a primary switch control circuit for turning the primary switch on and off using pulse modulation.

25. The SR of claim 23 and further comprising:
a primary turn on detection circuit outputting a primary turn on detect signal to reset the first set reset circuit, comprising:
  an amplifier coupled to receive the drain to source voltage of the SR transistor and to output first voltage;
  an offset circuit coupled to receive the first voltage and to output an offset voltage that is less than the peak of the first voltage by a $\Delta v$;
  a sample and hold circuit coupled to receive the offset voltage and to output a sampled voltage reference responsive to a sample pulse input; and
  a voltage comparator circuit configured to output the primary turn on detected signal when the first voltage exceeds the voltage reference.

* * * * *